(12) United States Patent
Klimuk et al.

(10) Patent No.: US 11,556,549 B2
(45) Date of Patent: Jan. 17, 2023

(54) METHOD AND SYSTEM FOR RANKING PLURALITY OF DIGITAL DOCUMENTS

(71) Applicant: YANDEX EUROPE AG, Lucerne (CH)

(72) Inventors: Tatsiana Alekseevna Klimuk, Vitebsk (BY); Aleksandr Valerevich Safronov, Moscow (RU); Maksim Sergeevich Busel, Zurich (CH); Timofei Andreevich Khatkevich, Minskaya oblast (BY)

(73) Assignee: YANDEX EUROPE AG, Lucerne (CH)

( * ) Notice: Subject to any disclaimer, the term of this patent is extended or adjusted under 35 U.S.C. 154(b) by 168 days.

(21) Appl. No.: 16/934,820

(22) Filed: Jul. 21, 2020

(65) Prior Publication Data

US 2021/0073239 A1    Mar. 11, 2021

(51) Int. Cl.
*G06F 16/00* (2019.01)
*G06F 16/2457* (2019.01)
*G06F 16/953* (2019.01)
*G06N 20/00* (2019.01)
*G06N 5/04* (2006.01)

(52) U.S. Cl.
CPC ...... *G06F 16/24578* (2019.01); *G06F 16/953* (2019.01); *G06N 5/04* (2013.01); *G06N 20/00* (2019.01)

(58) Field of Classification Search
CPC . G06F 16/24578; G06F 16/953; G06N 20/00; G06N 3/08; G06N 5/04
USPC .................................................. 707/600–899
See application file for complete search history.

(56) References Cited

U.S. PATENT DOCUMENTS

| | | | | |
|---|---|---|---|---|
| 10,346,453 | B2* | 7/2019 | Burges | G06N 20/00 |
| 10,754,897 | B2* | 8/2020 | Ho | G06F 16/24578 |
| 2005/0234904 | A1 | 10/2005 | Brill et al. | |
| 2007/0106659 | A1 | 5/2007 | Lu et al. | |
| 2007/0203908 | A1* | 8/2007 | Wang | G06F 16/3331 |
| | | | | 707/E17.069 |
| 2009/0116736 | A1 | 5/2009 | Neogi et al. | |
| 2010/0057717 | A1 | 3/2010 | Kulkami | |
| 2010/0070457 | A1 | 3/2010 | Kejariwal et al. | |
| 2015/0293976 | A1* | 10/2015 | Guo | G06F 16/9535 |
| | | | | 707/706 |
| 2016/0019219 | A1 | 1/2016 | Serdyukov et al. | |

(Continued)

FOREIGN PATENT DOCUMENTS

RU    2018146458 A    6/2020

OTHER PUBLICATIONS

English Abstract for RU2018146458 retrieved on Espacenet on Jul. 20, 2020.

*Primary Examiner* — Michelle N Owyang
(74) *Attorney, Agent, or Firm* — BCF LLP

(57) ABSTRACT

A method and server for ranking a plurality of documents are disclosed. The method includes determining, by the server, for each document from the plurality of documents a proximity value between a respective document vector and an other document vector. A given proximity value for a respective document being indicative of a similarity between (i) the respective document and (ii) at least one other one from the plurality of documents. The method also comprises using, by the server, the proximity values of the plurality of documents for ranking the plurality of documents.

16 Claims, 10 Drawing Sheets

(56) References Cited

U.S. PATENT DOCUMENTS

| | | |
|---|---|---|
| 2018/0113866 A1 | 4/2018 | Bendersky et al. |
| 2018/0189292 A1* | 7/2018 | Grace, Jr. ......... G06F 16/24578 |
| 2018/0225379 A1* | 8/2018 | Bhadury ............. G06F 16/3347 |
| 2018/0240013 A1* | 8/2018 | Strope ...................... G06N 5/04 |
| 2018/0285176 A1 | 10/2018 | Mozhaev |
| 2018/0293242 A1 | 10/2018 | Shishkin et al. |
| 2020/0226126 A1* | 7/2020 | Zou ...................... G06F 40/284 |

* cited by examiner

METHOD AND SYSTEM FOR RANKING PLURALITY OF DIGITAL DOCUMENTS

CROSS-REFERENCE

The present application claims priority to Russian Patent Application No. 2019128026, entitled "Method and System for Ranking Plurality of Digital Documents," filed on Sep. 5, 2019, the entirety of which is incorporated herein by reference.

FIELD

The present technology relates to search engine systems in general, and specifically to methods and systems for ranking a plurality of digital documents.

BACKGROUND

Various global or local communication networks (e.g., the Internet) offer users a vast amount of information. The information includes a multitude of contextual topics, such as but not limited to, news and current affairs, maps, company information, financial information and resources, traffic information, games and entertainment-related information. Users use a variety of client devices (desktop, laptop, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

However, it should be noted that the search results should be provided within an acceptable amount of time after a query submission. In other words, not only that search results provided to the user should be relevant, but the response time should also be short enough so that the user stays satisfied with the service provided via the search engine.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developers of the present technology have realized that ranking documents as described herein, which documents are to be provided as search results to a user of a search engine, for example, may allow increasing user satisfaction with the search results. More particularly, ranking documents as described herein and providing them in a ranked order as search results on a Search Engine Result Page (SERP) displayed to the user may increase user satisfaction with the SERP.

Developers of the present technology have also realized that using, for ranking purposes, proximity values between document vectors associated with documents that are to be ranked may increase user satisfaction with the SERP.

Developers of the present technology have also realized that proximity values between document vectors associated with documents may allow supplementing missing document data associated with at least some documents that are potentially providable as search results.

Developers of the present technology have also realized that proximity values between document vectors associated with documents may allow increasing the amount of "knowledge" that the server may use for ranking the documents. Developers of the present technology have also realized that proximity values between document vectors associated with documents may allow enriching the "knowledge" that the server has about the documents for ranking purposes.

Developers of the present technology have also realized that proximity values between document vectors associated with documents may allow determining which documents are likely to be similar to one another. Developers of the present technology have also realized that proximity values between document vectors associated with documents may allow determining which documents to be ranked in response to a query are, in a sense, "outliers" amongst those documents. Although documents are likely to be relevant to a given query, some documents of them may not be similar to most of the documents to be ranked.

In a first broad aspect of the present technology, there is provided a computer-implemented method of ranking a plurality of documents. The plurality of documents are associated with respective document data. The plurality of documents are to be used as search results in response to a query submitted by a user. The query is associated with query data, and the query has been submitted to a search engine hosted by a server. The plurality of documents is associated with respective document vectors and the query is associated with a query vector. A given document vector has been generated based on the document data associated with a respective document and the query vector has been generated based on the query data. The given document vector has been generated such that a proximity value between the respective document vector and the query vector is representative of a relevance of the respective document to the query. The method is executable by the server. The method comprises determining, by the server, for each document from the plurality of documents a proximity value between the respective document vector and an other document vector. A given proximity value for a respective document is indicative of a similarity between (i) the respective document and (ii) at least one other one from the plurality of documents. The method also comprises using, by the server, the proximity values of the plurality of documents for ranking the plurality of documents.

In some embodiments of the method, the document vectors and the query vector have been generated by the server executing a Machine Learning Algorithm (MLA). The MLA has been trained: (i) based on a given training document-query pair associated with a respective relevance score, where the relevance score is indicative of a relevance of a training document in the given training pair to a training query in the given training pair, (ii) to generate a training document vector for the training document and a training query vector for the training query, and (iii) such that a proximity value between the training document vector of the training document and the training query vector of the training query is representative of the relevance score.

In some embodiments of the method, the method further comprises generating, by the server, a reference vector for the plurality of documents as a combination of document vectors associated with the plurality of documents. the reference vector is the other document vector. The given proximity value is indicative of the similarity between (i) the respective document and (ii) other ones from the plurality of documents.

In some embodiments of the method, the reference vector is one of: an average vector generated based on the document vectors, a mean vector generated based on the document vectors, and a medoid vector generated based on the document vectors.

In some embodiments of the method, the plurality of documents is pre-selected from a pool of documents for ranking. The pre-selection is executed by the server prior to the determining for each document from the plurality of documents the proximity value between the respective document vector and the other document vector.

In some embodiments of the method, the pre-selection includes (i) a first pre-selection stage and (ii) a second pre-selection stage. The first pre-selection stage includes (i) determining, by the server, respective frequency parameters for documents from the pool of documents, where a given frequency parameter is indicative of a number of times query terms from the query are present in the respective document, and (ii) selecting, by the server, a first set of documents from the pool of documents. The first set of documents has documents associated with respective frequency parameters that are above a first threshold. The second pre-selection stage includes generating, by the server executing the MLA, document vectors for respective documents from the first set of documents based on the respective document data. The second pre-selection stage includes generating, by the server executing the MLA, the query vector associated with the query based on the query data. The second pre-selection stage includes determining, by the server, for each document from the first set of documents a respective proximity value between (i) the respective document vector and (ii) the query vector, where the proximity value is representative of a relevance of the respective document to the query. The second pre-selection stage includes selecting, by the server, a second set of documents from the first set of documents, where the second set of documents has documents associated with respective proximity values that are above a second threshold.

In some embodiments of the method, the second set of documents is the plurality of documents.

In some embodiments of the method, the server executes a ranking algorithm configured to rank the plurality of documents based on (i) the document data associated with the respective documents from the plurality of documents and (ii) additional document data associated with the plurality of documents.

In some embodiments of the method, the using the proximity values of the plurality of documents for ranking the plurality of documents comprises using, by the server, the proximity values as the additional document data for ranking the plurality of documents by the ranking algorithm.

In some embodiments of the method, document data comprises document data of a first type.

In some embodiments of the method, a first document from the plurality of documents has document data of the first type and a second document from the plurality of documents is missing document data of the first type. The method further comprises determining, by the server, a proximity value between (i) the document vector of the first document and (ii) the document vector of the second document. The method further comprises in response to the proximity value between (i) the document vector of the first document and (ii) the document vector of the second document being above a threshold, using, by the server, the document data of the first type of the first document as an estimation of the document data of the first type of the second document.

In some embodiments of the method, the method further comprises triggering, by the server, display of a Search Engine Results Page (SERP) on a device associated with the user. The SERP includes a plurality of search results. The plurality of documents is used as the plurality of search results. The plurality of search results are ranked in a same order as the ranked plurality of documents.

In some embodiments of the method, the MLA is a Neural Network (NN). The NN comprises a document-dedicated portion and a query-dedicated portion. The document-dedicated portion is configured to generate the training document vector based on document data associated with the training document. The query-dedicated portion is configured to generate the training query vector based on query data associated with the training query. The document-dedicated portion and the query-dedicated portion have been trained together such that the proximity value between (i) the training document vector and (ii) the training query vector is representative of the relevance score.

In a second broad aspect of the present technology, there is provided a server for ranking a plurality of documents. The plurality of documents is associated with respective document data. The plurality of documents to be used as search results in response to a query submitted by a user. The query is associated with query data. The query has been submitted to a search engine hosted by the server. The plurality of documents is associated with respective document vectors and the query being associated with a query vector. A given document vector has been generated based on the document data associated with a respective document and the query vector has been generated based on the query data. The given document vector has been generated such that a proximity value between the respective document vector and the query vector is representative of a relevance of the respective document to the query. The server is configured to determine for each document from the plurality of documents a proximity value between the respective document vector and an other document vector. A given proximity value for a respective document is indicative of a similarity between (i) the respective document and (ii) at least one other one from the plurality of documents. The server is configured to use the proximity values of the plurality of documents for ranking the plurality of documents.

In some embodiments of the server, the document vectors and the query vector have been generated by the server configured to execute a Machine Learning Algorithm (MLA), the MLA having been trained (i) based on a given training document-query pair associated with a respective relevance score, where the relevance score is indicative of a relevance of a training document in the given training pair to a training query in the given training pair, (ii) to generate a training document vector for the training document and a training query vector for the training query, and (iii) such that a proximity value between the training document vector of the training document and the training query vector of the training query is representative of the relevance score.

In some embodiments of the server, the server is further configured to generate a reference vector for the plurality of documents as a combination of document vectors associated with the plurality of documents. The reference vector is the other document vector. The given proximity value is indicative of the similarity between (i) the respective document and (ii) other ones from the plurality of documents.

In some embodiments of the server, the reference vector is one of: an average vector generated based on the document vectors, a mean vector generated based on the document vectors, and a medoid vector generated based on the document vectors.

In some embodiments of the server, the plurality of documents is pre-selected from a pool of documents for ranking. The pre-selection being is by the server prior to the determining for each document from the plurality of documents the proximity value between the respective document vector and the other document vector.

In some embodiments of the server, the pre-selection includes (i) a first pre-selection stage and (ii) a second pre-selection stage. The first pre-selection stage includes the server configured to (i) determine respective frequency parameters for documents from the pool of documents, where a given frequency parameter is indicative of a number of times query terms from the query are present in the respective document, and (ii) select a first set of documents from the pool of documents, where the first set of documents has documents associated with respective frequency parameters that are above a first threshold. The second pre-selection stage includes the server configured to generate, by executing the MLA, document vectors for respective documents from the first set of documents based on the respective document data. The second pre-selection stage includes the server configured to generate, by executing the MLA, the query vector associated with the query based on the query data. The second pre-selection stage includes the server configured to determine for each document from the first set of documents a respective proximity value between (i) the respective document vector and (ii) the query vector, where the proximity value is representative of a relevance of the respective document to the query. The second pre-selection stage includes the server configured to select a second set of documents from the first set of documents. The second set of documents has documents associated with respective proximity values that are above a second threshold.

In some embodiments of the server, the second set of documents is the plurality of documents.

In some embodiments of the server, the server executes a ranking algorithm configured to rank the plurality of documents based on (i) the document data associated with the respective documents from the plurality of documents and (ii) additional document data associated with the plurality of documents.

In some embodiments of the server, the server configured to use the proximity values of the plurality of documents for ranking the plurality of documents comprises the server further configured to use the proximity values as the additional document data for ranking the plurality of documents by the ranking algorithm.

In some embodiments of the server, document data comprises document data of a first type.

In some embodiments of the server, a first document from the plurality of documents has document data of the first type and a second document from the plurality of documents is missing document data of the first type. The server is further configured to determine a proximity value between (i) the document vector of the first document and (ii) the document vector of the second document. The server is further configured to, in response to the proximity value between (i) the document vector of the first document and (ii) the document vector of the second document being above a threshold, use the document data of the first type of the first document as an estimation of the document data of the first type of the second document.

In some embodiments of the server, the server is further configured to trigger display of a Search Engine Results Page (SERP) on a device associated with the user. The SERP includes a plurality of search results The plurality of documents is used as the plurality of search results. The plurality of search results is ranked in a same order as the ranked plurality of documents.

In some embodiments of the server, the MLA is a Neural Network (NN). The NN comprises a document-dedicated portion and a query-dedicated portion. The document-dedicated portion is configured to generate the training document vector based on document data associated with the training document. The query-dedicated portion is configured to generate the training query vector based on query data associated with the training query. The document-dedicated portion and the query-dedicated portion have been trained together such that the proximity value between (i) the training document vector and (ii) the training query vector is representative of the relevance score.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
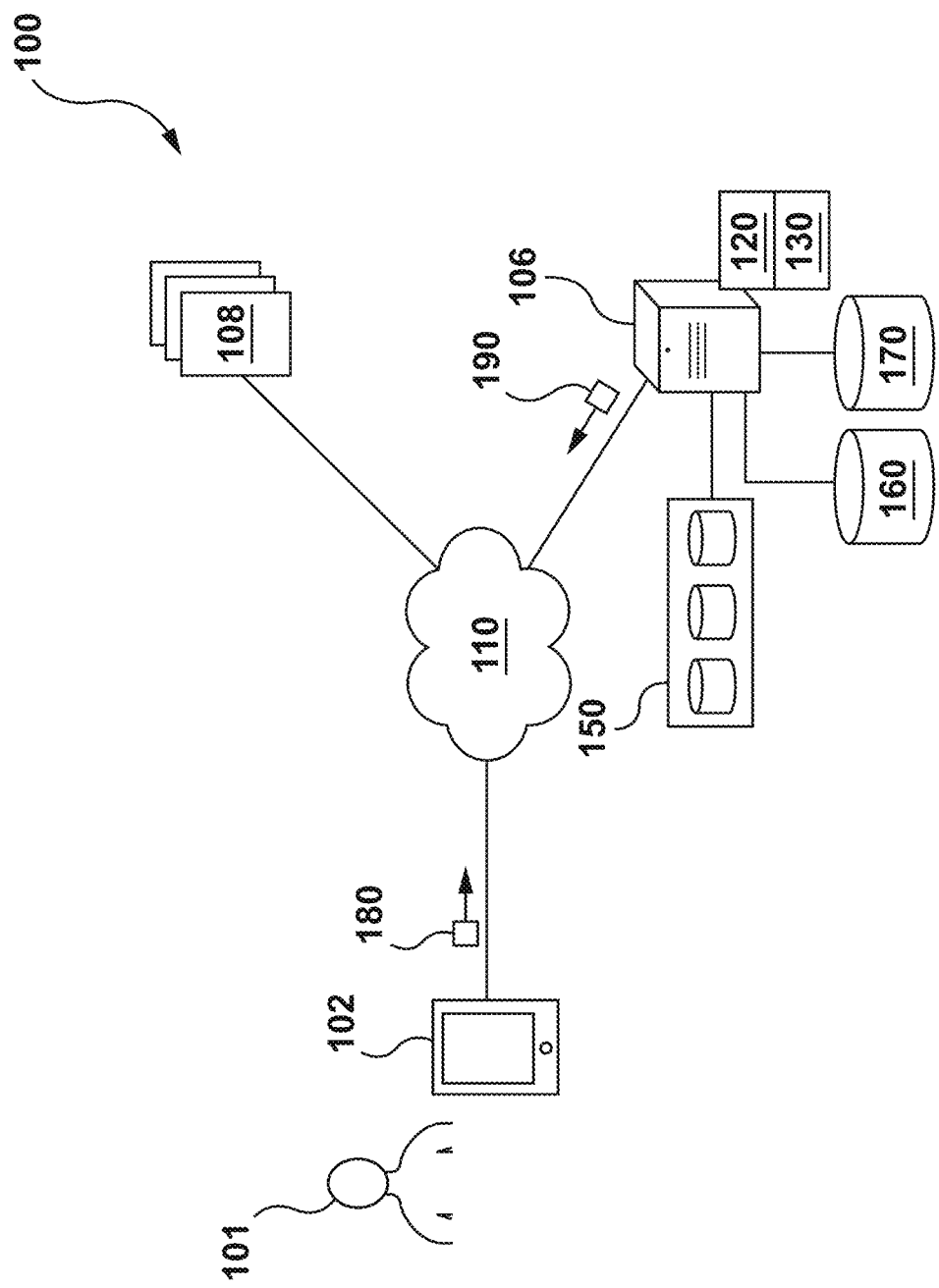
FIG. 1 depicts a schematic diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

Broadly speaking, the system 100 may be employed for providing search results to a given user in response to a query submitted thereby. To that end, the system 100 comprises inter alia an electronic device 102 associated with the user 101, a server 106, a plurality of resource servers 108 and a database system 150. For example, the user 101 may submit a given query via the electronic device 102 to the server 106 which, in response, is configured to provide search results to the user 101. The server 106 generates these search results based on information that has been retrieved from, for example, the plurality of resource servers 108 and stored in the database system 150. These search results provided by the system 100 may be relevant to the submitted query. Some functionality of components of the system 100 will now be described in greater detail.

Electronic Device

As mentioned above, the system 100 comprises the electronic device 102 associated with the user 101. As such, the electronic device 102, or simply "device" 102 can sometimes be referred to as a "client device", "end user device" or "client electronic device". It should be noted that the fact that the electronic device 102 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 102 include personal computers (desktops, laptops, netbooks, etc.), smartphones, tablets and the like. The device 102 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 102 may be embodied as a Yandex™ browser. For example, the user 101 may use the given browser application to (i) navigate to a given search engine website, and (ii) submit a query in response to which (s)he is to be provided with relevant search results.

The device 102 is configured to generate a request 180 in response to the user 101 submitting a query. The request 180 may take form of one or more data packets comprising information indicative of the query submitted by the user 101. The device 102 is also configured to receive a response 190. The response 190 may take form of one or more data packets comprising information indicative of search results that are relevant to the submitted query and computer-readable instructions for displaying by the given browser application to the user 101 these search results. How the content of the response 190 is generated in response to the submitted query will be described in greater details herein further below.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 102, the plurality of resource servers 108 and the server 106. For example, this means that the plurality of resource servers 108 is accessible via the communication network 110 by the device 102. In another example, this means that the plurality of resource servers 108 is accessible via the communication network 110 by the server 106. In a further example, this means that the server 106 is accessible via the communication network 110 by the device 102.

The communication network 110 may be used in order to transmit data packets amongst the device 102, the plurality of resource servers 108 and the server 106. For example, the communication network 110 may be used to transmit the request 180 from the device 102 to the server 106. In another example, the communication network 110 may be used to transmit the response 190 from the server 106 to the device 102.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof).

A given one of the plurality of resource servers 108 may be accessed by the device 102 in order to retrieve a given document stored on the given one of the plurality of resource servers 108. For example, the user 101 may enter a web address associated with a given web page in the given browser application of the device 102 and, in response, the device 102 may access a given resource server hosting the given web page in order to retrieve the document representative of the given web page for rendering the content of the web page via the given browser application.

A given one of the plurality of resource servers 108 may be accessed by the server 106 in order to retrieve a given document stored on the given one of the plurality of resource servers 108. The purpose for the server 106 accessing and retrieving documents from the plurality of resource servers 108 will be described in greater detail herein further below.

Server

The system 100 comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers.

Generally speaking, the server 106 is under control and/or management of a search engine provider (not depicted) such as, for example, an operator of the Yandex™ search engine. As such, the server 106 may be configured to host a given search engine for performing one or more searches responsive to queries submitted by users of the given search engine.

For example, the server 106 may receive the request 180 from device 102 indicative of the query submitted by the user 101. The server 106 may perform a search responsive to the submitted query for generating search results that are relevant to the submitted query. As a result, the server 106 may be configured to generate the response 190 indicative of the search results and may transmit the response 190 to the device 102 for display of the search results to the user 101 via the given browser application.

The search results generated for the submitted query may take many forms. However, in one non-limiting example of the present technology, the search results generated by the server 106 may be indicative of documents that are relevant to the submitted query. How the server 106 is configured to determine and retrieve documents that are relevant to the submitted query will become apparent from the description herein.

The server 106 is also configured to execute a crawler application 120. Broadly speaking, the crawler application 120 is used by the server 106 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

It is contemplated that the crawler application 120 may be periodically executable by the server 106 in order to retrieve/download documents that have been updated and/or became accessible over the communication network 110 since a previous execution of the crawler application 120.

The server 106 is also configured to employ a Machine Learning Algorithm, such as, for example, a Neural Network (NN) 130. Generally speaking, a given NN consists of a group of interconnected artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, data comparison and processing, clustering, including filtering, vector embedding, and the like.

To summarize, the implementation of the NN 130 by the server 106 can be broadly categorized into two phases—a training phase and an in-use phase. First, the NN 130 is trained in the training phase. Then, once the NN 130 knows what data to expect as inputs and what data to provide as outputs, the NN 130 is actually employed by the server 106 using in-use data in the in-use phase.

It is contemplated that in some embodiments of the present technology, the NN 130 may be implemented as a fully-connected NN. This means that neuron layers of the NN 130 may be connected such that every neuron of a given layer is connected to every neuron of a next layer. It is contemplated that the NN 130 may also be implemented as a feed-forward-type NN, an auto-encoder-type NN, and the like.

The server 106 may use the NN 130 to generate document vectors for documents that have been retrieved by the crawler application 120. It is contemplated that document vectors generated for documents may be used by the server 106 for an efficient processing of these documents in the database system 150.

The server 106 may also use the NN 130 to generate query vectors for queries that are submitted to the server 106. It is contemplated that query vectors generated for queries that are submitted to the server 106 may be used by the server 106 for an efficient retrieval of potentially relevant documents from the database system 150.

How the server 106 is configured to train the NN 130 and employ the NN 130 for generating document vectors as well as query vectors, as mentioned above, will be described in greater detail herein further below. However, prior to describing how the NN 130 is trained and then used by the server 106, the database system 150, a search engine data repository 160 and an operational repository 170 will be described in turn.

Database System

Figure 2:
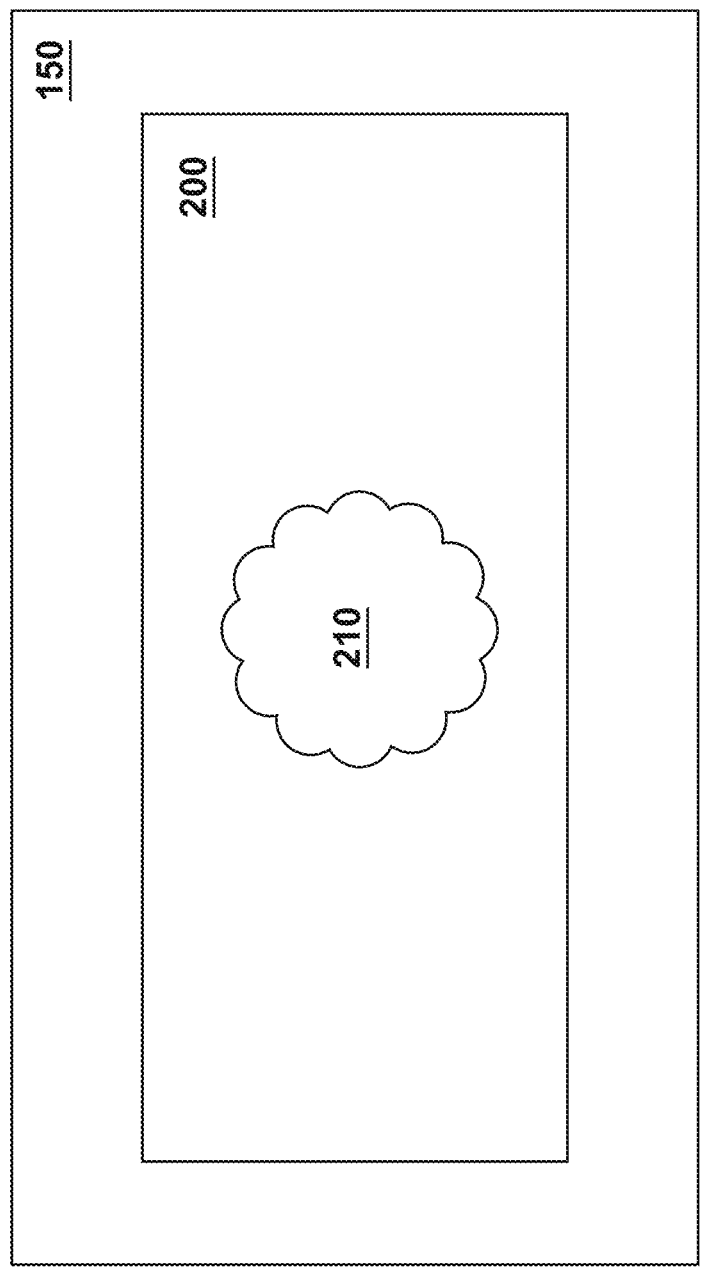
FIG. 2 depicts a schematic diagram of a database system of FIG. 1 in accordance with non-limiting embodiments of the present technology.

With reference to FIG. 2, the database system 150 is communicatively coupled to the server 106. Generally speaking, the database system 150 is configured to store a large number of documents that have been retrieved by the crawler application 120 and to provide the server 106 with access to this larger number of documents during document retrieval operations.

How the database system 150 is implemented is not particularly limited. In at least one embodiment of the present technology, the database system 150 may be implemented as disclosed in the Russian Patent Application 2018146458, entitled "METHOD AND SYSTEM FOR STORING A PLURALITY OF DOCUMENTS", and filed on Dec. 26 2018, content of which is incorporated herein by reference.

It should be noted that the database system 150 may be configured to store, in addition to the documents, document vectors in association with respective documents. As it will become apparent from the present description, the way that the server 106 generates document vectors for respective documents and stores them in the database system 150 may allow a more efficient processing of data in the database system 150 during document retrieval operations.

It is also contemplated that the database system 150 may include a plurality of database servers (not depicted), which are configured to host a database 200. Broadly speaking, the database 200 may be a structured collection of data about documents and is available to the server 106 for identifying potentially relevant documents for a submitted query. For example, document-based data 210 as illustrated in FIG. 2, which is data representative of document vectors stored in association with respective documents, may be part of this structured collection of data and is available by the server 106 for identifying potentially relevant documents in response to a submitted query.

In some embodiments of the present technology, the database 200 hosted by the database system 150 may also be "sharded", or in other words, separated into a plurality of shards (not depicted). This means that the structured collection of data hosted by the database system 150 may be partitioned and each partition may be stored and hosted as a respective shard of the database 200, without departing from the scope of the present technology.

Search Engine Data Repository

Returning to FIG. 1, the server 106 has access to the search engine data repository 160. Broadly speaking, the search engine data repository 160 is configured to store information associated with the search engine of the server 106. Although the search engine data repository 160 is illustrated in FIG. 1 as a separate entity from the database system 150, it is contemplated that the database system 150 may comprise the search engine data repository 160.

For example, the search engine data repository 160 may store information about previously performed searches by the given search engine. In another example, the search engine data repository 160 may store information about previously submitted queries to the server 106 and about documents that have been provided by the search engine of the server 106 as search results.

It is contemplated that the search engine data repository 160 may store query data associated with respective queries. Query data associated with a given query may be of different types and is not limiting. For example, the search engine data repository 160 may store query data for respective queries such as, but not limited to:
popularity of a given query;
frequency of submission of the given query;
number of clicks associated with the given query;
indications of other submitted queries associated with the given query;
indications of documents associated with the given query;
other statistical data associated with the given query;
text associated with the given query;
number of characters within the given query;
other textual data associated with the given query; and
other query-intrinsic characteristics of the given query.

As it will be described herein further below, at least some query data may be used by the server 106 for generating query vectors for respective queries and for ranking documents in response to the respective queries.

The search engine data repository 160 may also store document data associated with respective documents. Document data associated with a given document may be of different types and is not limiting. For example, the search engine data repository 160 may store document data for respective documents such as, but not limited to:
popularity of a given document;
click-through-rate for the given document;
time-per-click associated with the given document;
indications of other documents associated with the given document;
indications of queries associated with the given document;
other statistical data associated with the given document;
text associated with the given document;
other textual data associated with the given document;
memory size of the given document; and
other document-intrinsic characteristics of the given document.

As it will be described herein further below, at least some document data may be used by the server 106 for generating document vectors for respective documents and for ranking documents in response to queries.

It should be noted that document data of a given type for at least some documents may be missing from the search engine data repository 160. For example, where a first given document may be associated with document data of inter alia a first given type, document data of the first given type may be missing from the search engine data repository 160 for a second given document.

This may be the case for a variety of reasons. In one case, lack of document data of a given type for some documents may occur due to data corruption and/or data loss. In another case, lack of document data of a given type for a given document may occur simply because it has not yet been gathered by the server 106 for that given document.

The latter situation may be common, for example, for documents that have been only recently retrieved by the crawler application 120. As such, these recently retrieved documents may not have yet been presented as search results for users of the search engine, and hence, at least some types of document data for these recently retrieved documents may not have yet been gathered by the server 106.

Lack of document data of given types for documents may be problematic for ranking purposes of these documents. As previously alluded to, document data may be used during ranking operations, and therefore, missing document data of given types for some documents may restrict the amount of "knowledge" about these documents that is available to the server 106 during ranking operations.

As it will become apparent from the description below, developers of the present technology have devised methods and systems, in accordance with at least some non-limiting embodiments of the present technology, that may allow supplementing document data of a given type that is missing from the search engine data repository 160 for one document by using document data of the given type that is available at the search engine data repository 160 for another document.

It is contemplated that in at least some embodiments of the present technology, the server 106 may estimate document data of a given type that is missing from the search engine data repository 160 for the one document based on document data of the given type that is available at the search engine data repository 160 for another document, based on a determination that the one document and another document are determined by the server 106 to be similar. How the server 106 is configured to determine that the one and another document are similar, and how the server 106 may use this determination for supplementing document data that is missing will be described in greater details herein further below.

Figure 3:
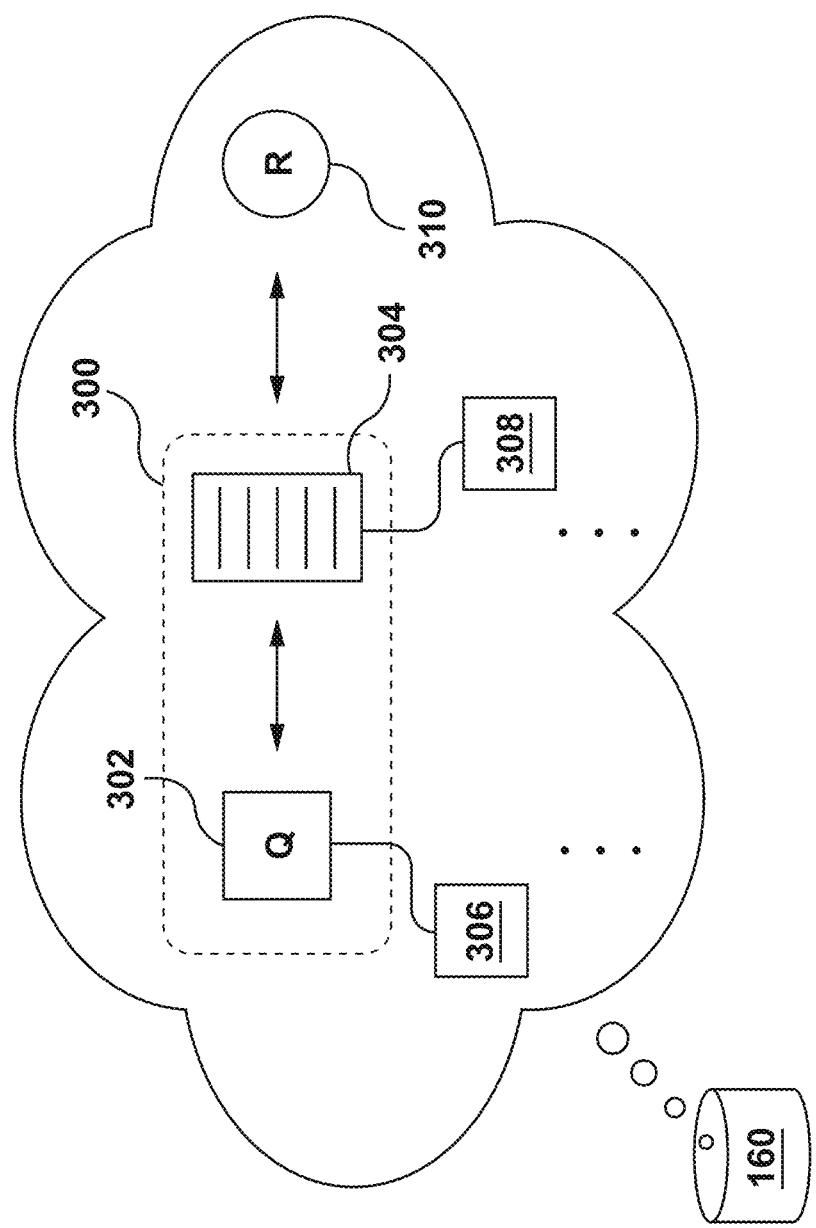
FIG. 3 depicts content stored in a search engine data repository of FIG. 1 in accordance with non-limiting embodiments of the present technology.

It is contemplated that the search engine data repository 160 may also store information in a form of "query-document pairs". For example, with reference to FIG. 3, the search engine data repository 160 may store a large number of query-document pairs similar to a query-document pair 300. The query-document pair 300 comprises a query 302 and a document 304. For example, the query 302 may be a previously submitted query to the server 106, while the document 304 may be a previously provided document by the search engine in response to the query 302.

As explained above, the search engine data repository 160 may store query data associated with respective queries and document data associated with respective documents. For example, the search engine data repository 160 may store the query 302 in association with query data 306, while storing the document 302 in association with document data 308.

It is also contemplated that the search engine data repository 160 may store data indicative of a relevance score for a given query-document pair. A given relevance score for a given query-document pair is indicative of how relevant the document from the given query-document pair is to the query from the given query-document pair. For example, the search engine data repository 160 may store data indicative of a relevance score 310 for the query-document pair 300.

The relevance score 310 is indicative of how relevant the document 304 is to the query 302.

How the relevance scores for respective query-document pairs are determined is not limiting. In one example, the relevance scores may be at least partially derived from user-interaction data associated with a respective query-document pair. In another example, the relevance scores may be assessed by human assessors that have been tasked with assessing a relevance of a given document provided thereto in response to a given query provided thereto.

The server 106 may be configured to use the information stored in the search engine data repository 160 as training data for training the NN 130. It is also contemplated that the server 106 may also use the information stored in the search engine data repository 160 during the in-use phase of the NN 130. How the server 106 is configured to use the information stored in the search engine data repository 160 will be described in greater details herein below.

Operational Repository

Returning to FIG. 1, the server 106 has access to the operational repository 170. Broadly speaking, the operational repository 170 may be used by the server 106 in order to store, temporarily or permanently, information that is determined/generated by the server 106 during its operation for future use thereof. Although the operational repository 170 is illustrated in FIG. 1 as a separate entity from the database system 150, it is contemplated that the database system 150 may comprise the operational repository 170 and/or the search engine data repository 160.

Figure 4:
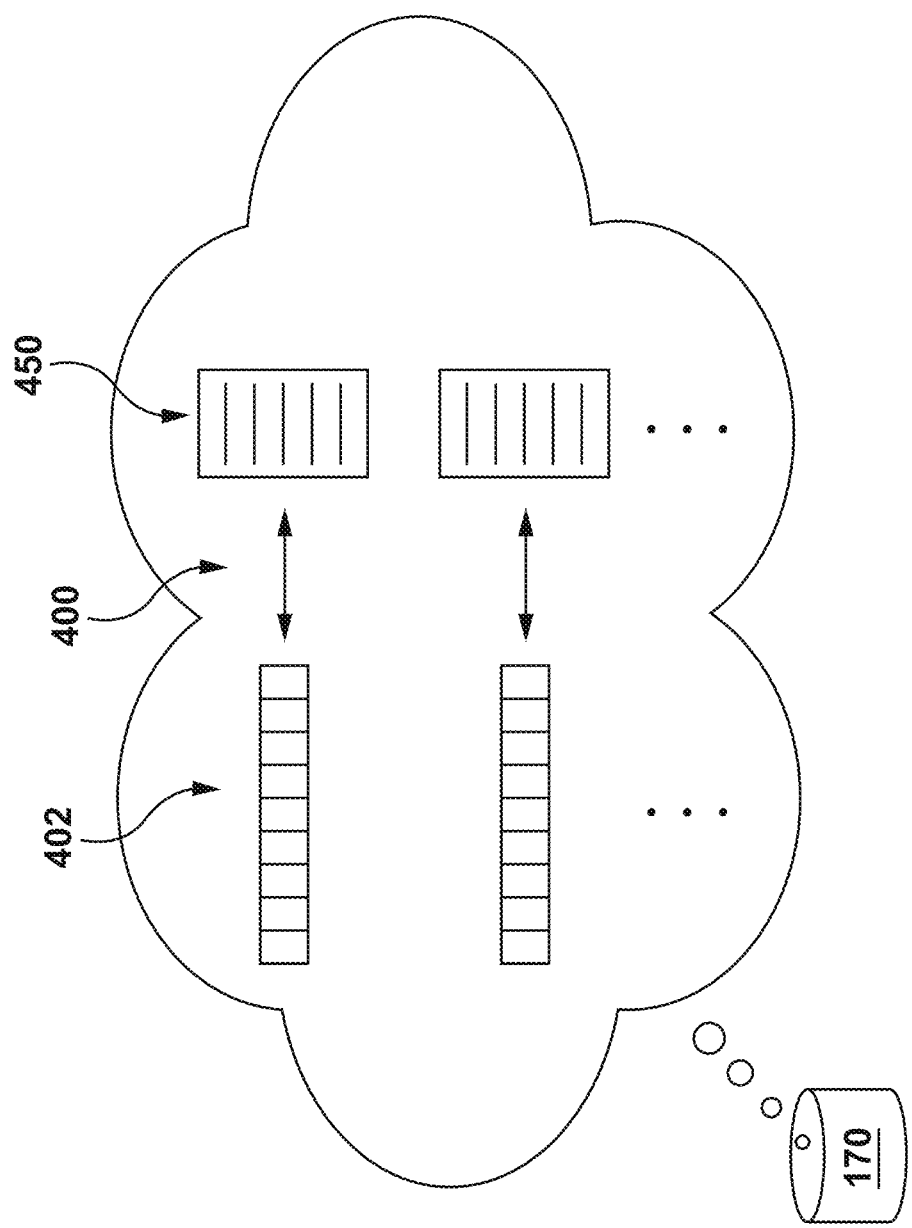
FIG. 4 depicts content stored in an operational repository of FIG. 1 in accordance with non-limiting embodiments of the present technology.

In one non-limiting example depicted in FIG. 4, the operational repository 170 may be used by the server 106 to store, temporarily or permanently, NN-generated data 400 that may be generated by the NN 130 during the in-use phase thereof. The NN-generated data 400 comprises a pool of document vectors 402, as mentioned above, and the pool of document vectors 402 is associated with a pool of documents 450. The pool of document vectors 402, as it will be described below, are generated by the NN 130 during the in-use phase of the NN 130.

During operation of the server 106, the server 106 may employ the NN 130 (see FIG. 1) for generating, for each one of the pool of documents 450, a respective document vector from the pool of document vectors 402. As a result, the server 106 may be configured to store in the operational repository 170, temporarily or permanently, document vectors in association with respective documents based on which they are generated by the NN 130.

It should be noted that the pool of documents 450 may comprise documents that are retrieved by the crawler application 120 and/or that have been previously provided as search results by the search engine. In one non-limiting example, the pool of documents 450 may comprise all documents that are potentially providable by the search engine of the server 106 as search results in response to submitted queries.

It should be noted that, once generated, the NN-generated data 400 may be stored in the database system 150 as the document-based data 210 of the database 200 (see FIG. 2). How the server 106 is configured to train the NN 130 during its training phase for generating the pool of document vectors 402 during its in-use phase will now be described.

Training Phase of NN

Figure 5:
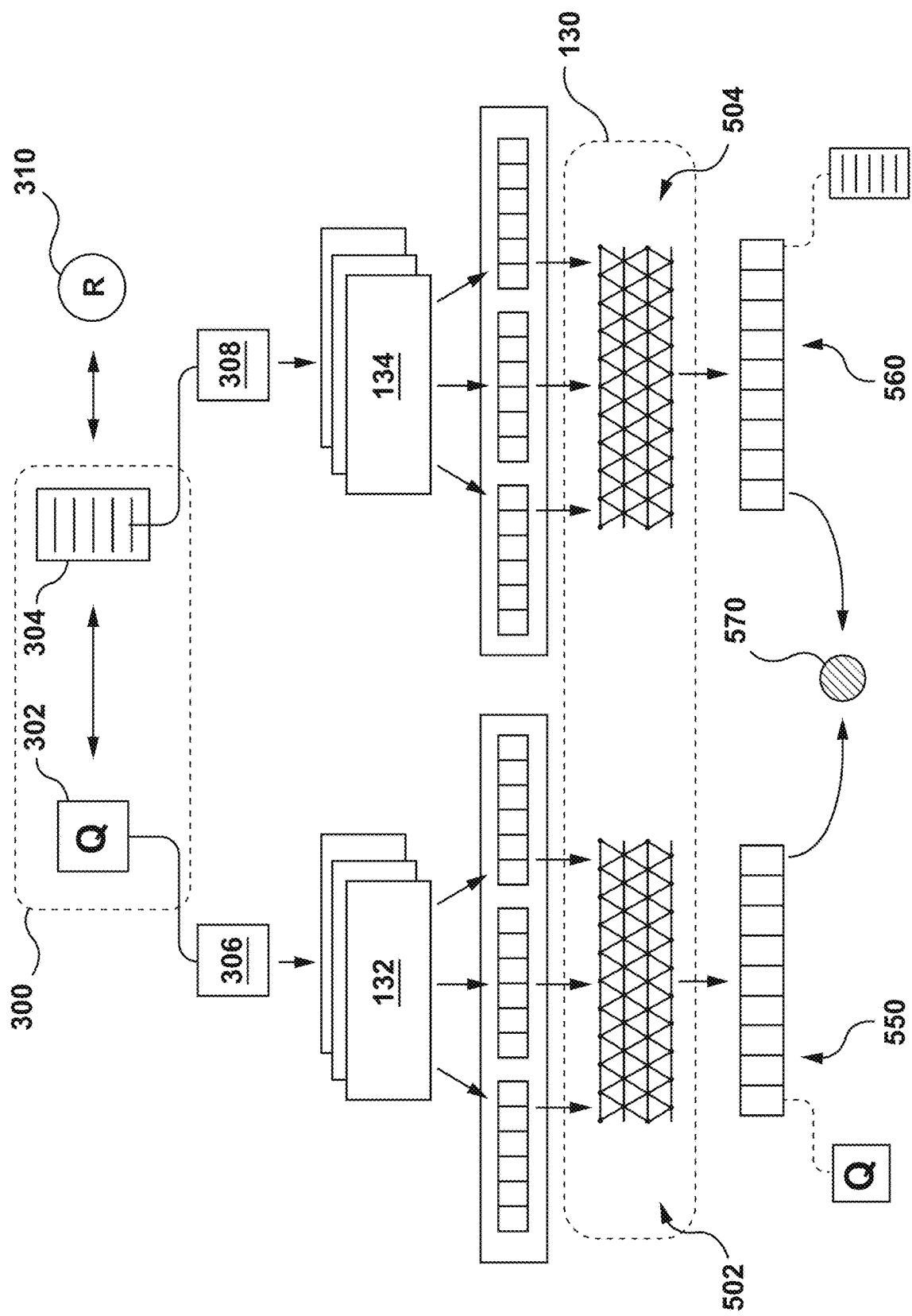
FIG. 5 depicts a schematic diagram of a given training iteration of a Neural Network of a server of FIG. 1 in accordance with non-limiting embodiments of the present technology.

With reference to FIG. 5, there is depicted a given training iteration of the NN 130. Although only one training iteration of the NN 130 is illustrated in FIG. 5, it should be noted that the server 106 may be configured to perform a large number of training iterations similarly to how the server 106 is configured to perform the given training iteration depicted in FIG. 5, without departing from the scope of the present technology.

It should be noted that the NN 130 is trained based on a given training query-document pair. In the non-limiting example illustrated in FIG. 5, the NN 130 is trained based on the query-document pair 300. It is contemplated that each training iteration of the NN 130 may be performed based on a respective query-document pair retrieved by the server 106 form the search engine data repository 160.

It should be noted that the server 106 may be configured to execute a plurality of query vectorization models 132 and a plurality of document vectorization models 134. Broadly speaking, a given vectorization model is configured to, in a sense, transform "raw data" about an entity into a vector form that is representative of this raw data. As such, the purpose of the given vectorization model is to receive raw data of a given type, process this raw data of the given type, and generate a respective vector for the raw data of the given type.

Models in the plurality of query vectorization models 132 and the plurality of document vectorization models 134 are not particularly limiting. In at least some embodiments of the present technology, the plurality of query vectorization models 132 and the plurality of document vectorization models 134 may be implemented as disclosed in Russian Patent Application 2018146458, entitled "METHOD AND SYSTEM FOR STORING A PLURALITY OF DOCUMENTS", and filed on Dec. 26 2018, the content of which is incorporated herein by reference. However, just as examples, the plurality of query vectorization models 132 and/or the plurality of document vectorization models 134 may include, but not limited to: Deep Structured Semantic Models (DSSMs), bag-of-word-type models, Word2vec-type models, Sent2vec-type models, and the like. Hence, it is contemplated that various vectorization techniques and methods may be used for generating sub-vectors.

As illustrated in FIG. 5, the server 106 may use the query data 306 associated with the query 302 as input for the plurality of query vectorization models 132 that transforms the query data 306 into a vectorized format suitable as input for the NN 130. Similarly, the server 106 may use the document data 308 associated with the document 304 as input for the plurality of document vectorization models 134 that transform the document data 308 into a vectorized format suitable as input for the NN 130. As such, it can be said that the server 106 may employ the plurality of query vectorization models 132 and the plurality of document vectorization models 134 to transform "raw data" about queries and documents into training inputs for the NN 130.

It should also be noted that the NN 130 comprises two NN portions, namely a query-dedicated portion 502 and a document-dedicated portion 504. The query-dedicated portion 502 is configured to receive data from the plurality of query vectorization models 132. The document-dedicated portion 504 is configured to receive data from the plurality of document vectorization models 134.

The query-dedicated portion 502 is configured to generate a training query vector 550 while the document-dedicated portion 504 is configured to generate a training document vector 560. The training query vector 550 is associated with the query 302 and is based on the query data 306, while the training document vector 560 is associated with the document 304 and is based on the document data 308.

Once the training query vector 550 and the training document vector 560 are generated by the query-dedicated portion 502 and by the document-dedicated portion 504, respectively, the server 106 may be configured to determine a training proximity value 570 between the training query vector 550 and the training document vector 560. For example, the training proximity value 570 may correspond to a "vectorial" distance between the training query vector 550 and the training document vector 560. The training proximity value 570 may be indicative of how spatially close the training query vector 550 and the training document vector 560 are to one another.

This "vectorial distance" between a pair of vectors may take many forms and may be determined in a variety of manners by the server 106. In one example, a "vectorial" distance between vectors may refer to a Euclidian distance between these vectors. In another example, the "vectorial" distance between vectors may refer to a scalar product between these vectors. As such, it is contemplated that the "vectorial" distance may refer to a spatial proximity between two vectors mapped in a vector-space, without departing from the scope of the present technology.

The purpose of training the NN 130 is to condition the NN 130 to generate a respective query vector and a respective document vector such that a respective proximity value is representative of a respective relevance score of a given query-document pair. In this case, the purpose of training the NN 130 is to condition the NN 130 to generate the training query vector 550 and the training document vector 560 such that the training proximity value 570 is representative of the relevance score 310 for the training query-document pair 300.

In order to condition the NN 130 to generate the training query vector 550 and the training document vector 560 such that the training proximity value 570 is representative of the relevance score 310 for the query-document pair 300, the server 106 may be configured to compare the training proximity value 570 against the relevance score 310. Based on this comparison, the server 106 may employ different training techniques for adjusting the connections amongst "neurons" of the NN 130 and thereby conditioning the NN 130. Just as an example, the server 106 may employ back-propagation techniques for adjusting the connections amongst "neurons" of the NN 130 based on the situation encountered during the given training iteration of the NN 130.

As a result, the NN 130 is conditioned during the training phase thereof to (i) receive an input based on query data associated with a given query and to use the query-dedicated portion 502 to generate a given query vector, (ii) receive an input based on document data associated with a given document and to use the document-dedicated portion 504 to generate a given document vector, and (iii) such that a proximity value between the given document vector and the given query vector is representative of a relevance of the given document to the given query.

It should be noted that a proximity value between the given document vector and the given query vector being representative of a relevance of the given document to the given query means that (i) the more the given document is relevant to the given query (ii) the more the given document vector is spatially close to the given query vector. By the same token, it should be further noted that the proximity value between the given document vector and the given query vector being representative of a relevance of the given document to the given query means that (i) the less the given document is relevant to the given query (ii) the more the given document vector is spatially far from the given query vector.

The developers of the present technology have also realized that training the NN 130 for generating query vectors and document vectors, as described above, may have additional benefits in at least some embodiments of the present technology. For example, developers of the present technology have realized that training the NN 130 for generating query vectors and documents vectors may, not only allow estimating a relevance between a given query and a given document by determining a proximity value between a respective query vector and a respective document vector, but also allow estimating how similar a pair of documents are to one another by determining a proximity value between the respective pair of document vectors.

To better illustrate this, let it be assumed that the NN 130, trained as described above, generates (i) for a given query a given query vector, (ii) for a first document a first document vector, and (iii) for a second document a second document vector. As mentioned above, a first proximity value between the given query vector and the first document vector is representative of a relevance of the first document to the given query, while a second proximity value between the given query vector and the second document vector is representative of a relevance of the second document to the given query.

Now let it be assumed that the first proximity value and the second proximity value are similar. This means that the first document and the second document have a similar relevance to the given query. Developers of the present technology have realized that documents having a similar relevance to a common query are likely to be similar themselves. Therefore, it is contemplated that training the NN 130 as described above may result in the NN 130 being conditioned to generate similar document vectors for similar documents. In other words, if the first proximity value and the second proximity value are similar, then the first document vector and the second document vector generated by the NN 130 are also similar.

Therefore, it can be said that in at least some embodiments, training the NN 130 as described above may allow estimating similarity between pairs of documents by determining how spatially close (or far) their respective document vectors are.

It should be noted that a proximity value between the first document vector and the second document vector being indicative of a similarity between the first document and the second document means that (i) the more the first document vector is spatially close to the second document vector (ii) the more similar the first document is likely to be to the second document. By the same token, it should be further noted that the proximity between the first document vector and the second document vector being indicative of a similarity between the first document and the second document means that (i) the more the first document vector is spatially far from the second document vector (ii) the less similar the first document is likely to be to the second document.

In view of the above and for the sake of simplicity, a given proximity value between a given query vector and a given document vector will now be referred as a "query-to-document" (Q2D) proximity value and is representative of a relevance of a respective document to a respective query. By the same token, a given proximity value between a first document vector and a second document vector will now be referred as a "document-to-document" (D2D) proximity value and is indicative of a similarity between the first document and the second document.

Returning to the description of the NN 130, it should be noted that during the given training iteration of the NN 130 of FIG. 5, the query-dedicated portion 502 and the document-dedicated portion 504 are trained together/simultaneously since both the connections amongst "neurons" of the query-dedicated portion 502 and the connections amongst "neurons" of the document-dedicated portion 504 are adjusted together/simultaneously with each iteration, when needed, based on the comparison between a training proximity value (e.g., the training proximity value 570) and a relevance score (e.g., the relevance score 310).

As a result, the query-dedicated portion 502 and the document-dedicated portion 504 are trained by conditioning the query-dedicated portion 502 and the document-dedicated portion 504 together/simultaneously to generate respective vectors such that the proximity between these vectors is representative of the relevance score for the query-document pair for which the vectors are generated.

However, it should be noted that, although the query-dedicated portion 502 and the document-dedicated portion 504 are trained together/simultaneously, during the in-use phase of the NN 130, the query-dedicated portion 502 and the document-dedicated portion 504 are used separately by the server 106. How the server 106 is configured to employ the NN 130 during the in-use phase thereof, and more particularly, how the server 106 may use the trained document-dedicated portion 504 and the trained query-dedicated portion 502, will now be described.

In-Use Phase of NN

As previously alluded to, the in-use phase of the NN 130 consists, on the one hand, of the server 106 using the document-dedicated portion 504 and, on the other hand, of the server 106 using the query-dedicated portion 502.

On the one hand, with reference to FIG. 4, the server 106 may use the document-dedicated portion 504 of the NN 130 for generating the pool of document vectors 402 for the pool of documents 450.

Each one of the pool of document vectors 402 may be generated by the document-dedicated portion 504 based on document data associated with a respective one of the pool of documents 450. Each one of the pool of document vectors 402 may be generated by the document-dedicated portion 504 similarly to how the document-dedicated portion 504 generates the training document vector 560 (see FIG. 5).

As a result, the server 106 may employ the trained document-dedicated portion 504 of the NN 130 in order to generate a respective one of the pool of document vectors 402 for a respective one of the pool of documents 450. The server 106 may store, permanently or temporarily, the NN-generated data 400 in the operational repository 170 for future use thereof. It is also contemplated that the NN-generated data 400 may also be stored as the document-based data 210 of the database 200 for future document retrieval operations.

On the other hand, the server 106 may use the query-dedicated portion 502 of the NN 130 for generating a given query vector for a given query submitted to the server 106 in response to which the server 106 is to provide search results.

For example, the server 106 may be configured to receive the request 180 (see FIG. 1) indicative of a query submitted by the user 101. The server 106 may retrieve query data from the search engine data repository 160 that is associated with the query submitted by the user 101. As a result, the server 106 may employ the trained query-dedicated portion 502 of the NN 130 in order to generate a given query vector for the query submitted by the user 101 based on the query data associated with the query submitted by the user 101.

It is contemplated that query data for the query submitted by the user 101 may be pre-processed and stored in the search engine data repository 160 before receipt of the request 180. In other cases, this query data may be processed upon receipt of the request 180 and provided to the server 106 for further use thereof. In further cases, the query data for the query submitted by the user 101 may be partially pre-processed and stored in the search engine data repository 160 before receipt of the request 180 and partially processed upon receipt of the request 180, without departing from the scope of the present technology.

How the server 106 is configured to operate in response to the request 180, in at least some embodiments of the present technology, will now be described in greater detail.

Server Operation

Figure 6:
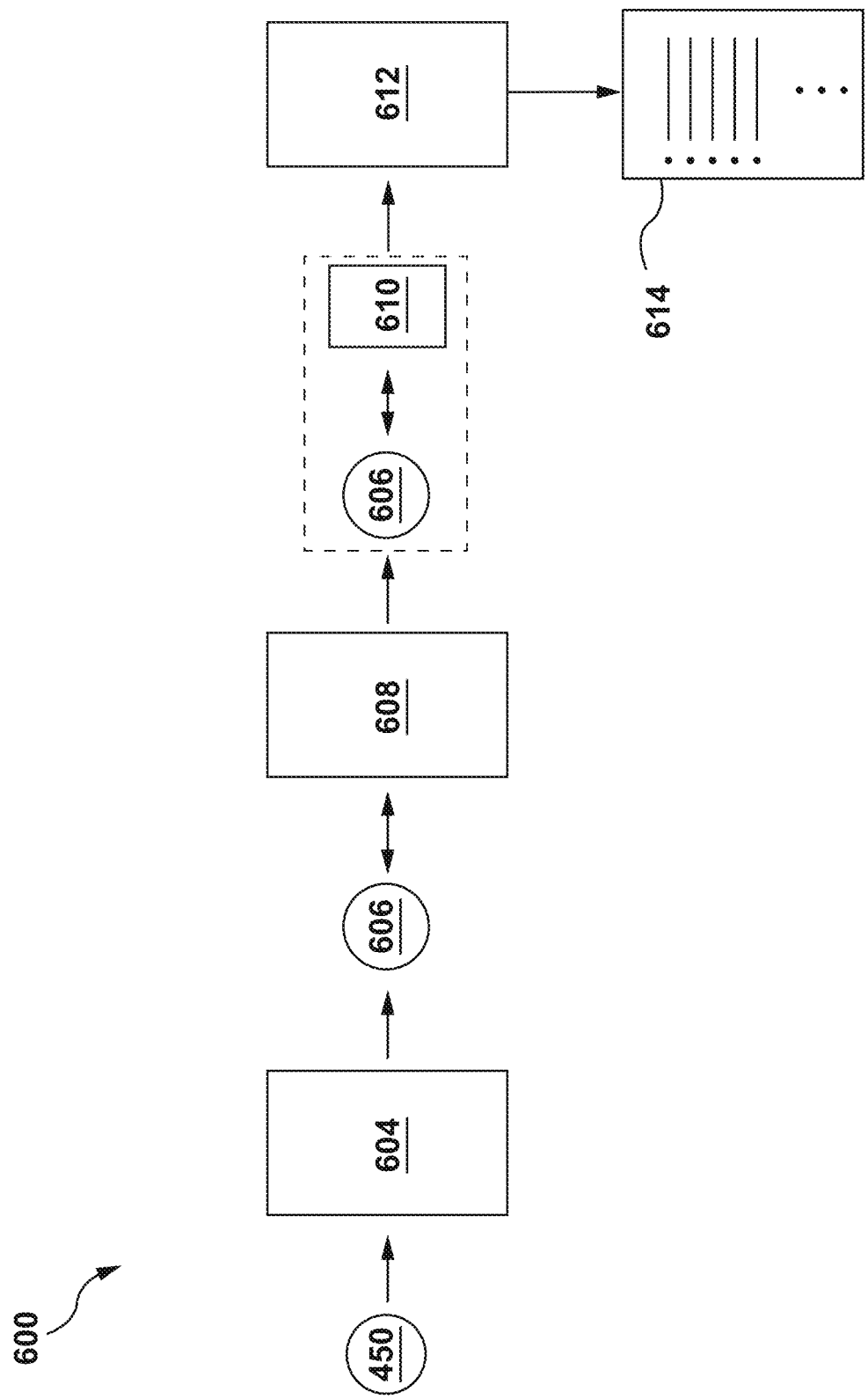
FIG. 6 is a schematic diagram of a processing sequence for ranking documents by the server of FIG. 1 in accordance with non-limiting embodiments of the present technology.

In some embodiments of the present technology it is contemplated that the server 106 may be configured to perform a processing sequence 600 schematically illustrated in FIG. 6. As illustrated, the processing sequence 600 may include inter alia (i) a pre-selection procedure 604, (ii) Document Similarity Determination (DSD) procedure 608, and (iii) a ranking procedure 612. Broadly speaking, the purpose of the processing sequence 600 is to determine a ranked list of documents 614 in response to the query submitted via the request 180.

The server 106 may be configured to perform the pre-selection procedure 604 of the processing sequence 600, for example, after receiving the request 180. Generally speaking, the purpose of the pre-selection procedure 604 is to reduce a number of documents to be subsequently used during the processing sequence 600.

It should be recalled that the pool of documents 450, which includes the documents that are potentially providable as search results, may include a very large number of documents. As such, ranking all of the documents in the pool of documents 450 in response to the submitted query may require not only a considerable amount of time, but also a considerable amount of processing resources. Therefore, rather than ranking all of the documents in the pool of documents 450, the server 106 may be configured to perform the pre-selection procedure 604 in order to reduce a total number of documents to be ranked by the server 106. This means that the plurality of documents 606 determined by the server 106, as a result of the pre-selection procedure 604, may include a smaller number of documents than the pool of documents 450. How the server 106 is configured to perform the pre-selection procedure 604 will be discussed in greater details herein further below.

Upon determining the plurality of documents 606, for example, the server 106 may be configured to perform a DSD procedure 608 for the plurality of documents 606. Broadly speaking, the purpose of the DSD procedure 608 is to determine, for documents from the plurality of documents 606, plurality D2D proximity values 610. The plurality of D2D values 610 may then be used as additional document data during the ranking procedure 612—that is, the purpose of the DSD procedure 608 is to determine, in a sense, additional "ranking features" for respective documents from the plurality of documents 606. How the plurality of D2D proximity values 610 is determined for the plurality of documents 606 will be discussed in greater details herein further below.

Upon determining the plurality of D2D proximity values 610 for the plurality of documents 606, for example, the server 106 may be configured to perform the ranking procedure 612. Broadly speaking, the purpose of the ranking procedure 612 is to rank the plurality of documents 606 for the given query submitted by the user 101. In one case, the server 106 may perform the ranking procedure 612 in order to determine the ranked list of documents 614 that includes at least some documents from the plurality of documents 606 and which are listed in a ranked order. As alluded to above, the server 106 may use inter alia the plurality of D2D proximity values 610 during the ranking procedure 612. How the server 106 is configured to perform the ranking procedure 612 will be discussed in greater details herein further below.

Figure 7:
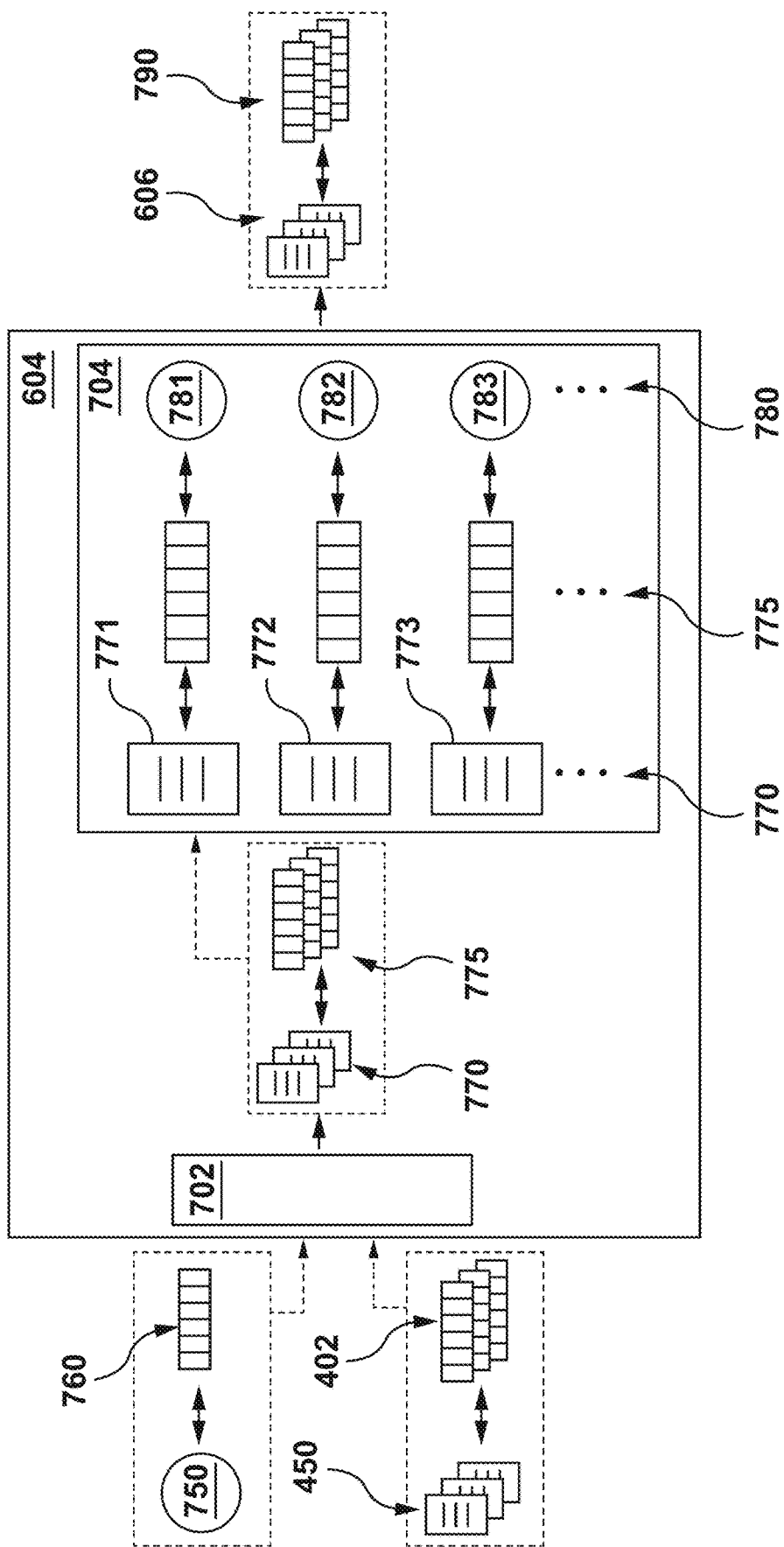
FIG. 7 depicts a schematic diagram of a pre-selection procedure of the processing sequence of FIG. 6 in accordance with non-limiting embodiments of the present technology.

With reference to FIG. 7, how the server 106 is configured to perform the pre-selection procedure 604 will now be discussed.

Pre-Selection Procedure

In some embodiments of the present technology, the pre-selection procedure 604 may be performed by the server 106 in more than one stage—that is, the pre-selection procedure 604 may include a first pre-selection stage 702, and a second pre-selection stage 704.

Let it be assumed that the given query submitted by the user 101 to the server 106 is a query 750. As such, during the first pre-selection stage 702, the server 106 may be configured to determine respective frequency parameters for documents from the pool of documents 450 and where a given frequency parameter is indicative of a number of times query terms from the query 750 are present in the respective documents.

For example, for a first document from the pool of documents 450, the server 106 may determine a frequency parameter of "2000" indicative of that query terms from the query 750 are present two thousand times in the content of the first document. In another example, for a second document from the pool of documents 450, the server 106 may determine a frequency parameter of "3" indicative of that query terms from the query 750 are present three times in the content of the second document. It should be noted that since the frequency parameter for the first document is comparatively high to the frequency parameter of the second document, the first document is likely to be more relevant for the query 750 than the second document.

How the server 106 is configured to determine the frequency parameter is not limiting. Just as an example, the server 106 may be configured to execute a parsing algorithm onto document content as known in the art. It is also contemplated that the server 106 may be configured to employ data stored in association with document posting lists (e.g., from an inverted index of documents) for determining the frequency parameters, without departing from the scope of the present technology.

As such, in some embodiments, once the server 106 determines frequency parameters for the pool of documents 450, the server 106 may select a first set of documents 770 from the pool of documents 602 such that the first set of documents 770 includes documents that are associated with respective frequency parameters being above a first pre-determined threshold. As such, the first pre-selection stage 702 may allow selecting, amongst the pool of documents 450, documents that include the highest number of query terms from the query 750. The first pre-determined threshold may be determined by the operator of the search engine, for example.

However, it should be noted that other types of frequency parameters may be determined during the first pre-selection stage 702 as known in the art and used similarly to how the above-described frequency parameters are used. In other embodiments, other heuristic parameters as known in the art may be used during the first pre-selection stage 702 in order to select the first set of documents 770 from the pool of documents 602, without departing from the scope of the present technology.

In some embodiments of the present technology, the server 106 may also be configured to perform the second pre-selection stage 704 of the pre-selection procedure 604. For example, the server 106 may perform the second pre-selection stage 704 on the first set of documents 770.

Recalling that the pool of documents 450 is associated with the pool of document vectors 402, it should be noted that the first set of documents 770 is associated with a first set of document vectors 775. In other words, the first set of document vectors 775 is a subset of document vectors from the pool of document vectors 402 that are associated with the first set of documents 770.

Also, let it be assumed that the server 106 employs the NN 130 in order to generate a query vector 760 based on the query 750 (as described above). Based on the query vector 760 and the first set of document 770, the server 106 may be configured to determine a plurality of Q2D proximity values 780 for the first set of documents 770. This means that the server 106 may be configured to determine, for each document from the first set of documents 770, a respective Q2D proximity value between a respective document vector from the first set of document vectors 775 and the query vector 760. As illustrated in FIG. 7, the server 106 may be configured to generate (i) a first Q2D proximity value 781 for a first document 771, (ii) a second Q2D proximity value 782 for a second document 772, and (iii) a third Q2D proximity value 783 for a third document 773.

Once the plurality of Q2D proximity values 780 for the first set of documents 770 is determined by the server 106, the server 106 may select, from the first set of document 770, the plurality of documents 606 that are associated with respective Q2D proximity values that are above a second pre-determined threshold. It should be noted that so-selecting the plurality of documents 606 allows selecting documents that are likely to be the most relevant ones to the query 750 amongst the first set of documents 770. The second pre-determined threshold may be determined by the operator of the search engine, for example. Needless to say, the plurality of documents 606 is associated with a plurality of document vectors 790, as illustrated in FIG. 7, which is a subset of document vectors from the pool of document vectors 402.

In some embodiments of the present technology, the selection of documents that are likely to be the most relevant ones to the query 750 amongst the first set of documents may also be performed by a variety of Machine Learning Algorithms (MLAs). Just as an example, the server 106 may employ a decision tree-based MLA configured to use at least the plurality of Q2D proximity values 780 as input features for performing the selection of such documents.

It is contemplated that the first set of documents 770 may include fewer documents than the pool of documents 450. Also, it is contemplated that the plurality of documents 606 may include fewer documents than the first set of documents 770. As such, the plurality of documents 606 may include fewer documents than the pool of documents 602.

Again, it should be noted that the first pre-selection stage 702 may be performed in a different manner from what has been described above. In some embodiments, the first pre-selection stage 702 may even be omitted. For example, in those embodiments where the first pre-selection stage 702 is omitted, the server 106 may perform the second pre-selection stage 704 on at least some documents from the pool of documents 450 for determining the plurality of documents 606, similarly to how the server 106 performs the second pre-selection stage 704 on the first set of documents 770.

How the server 106 is configured to perform the DSD procedure 608 will now be described in greater detail.

DSD Procedure

As previously alluded to, the purpose of the DSD procedure 608 is to determine, for documents from the plurality of documents 606, the plurality D2D proximity values 610 (see FIG. 6). Therefore it can be said that, during the DSD procedure 608, the server 106 may be configured to, for a given document from the plurality of documents 606, determine a respective D2D proximity value between (i) the respective document vector from the plurality of document vectors 790, and (ii) another document vector.

As it will become apparent from the description herein further below, the another document vector to be used by the server 106 for determining a given D2D proximity value may be (i) selected by the server 106 as a given document vector from the plurality of documents vectors 790, and/or (ii) determined by the server 106 based on a combination of the plurality of documents vectors 790.

Figure 8:
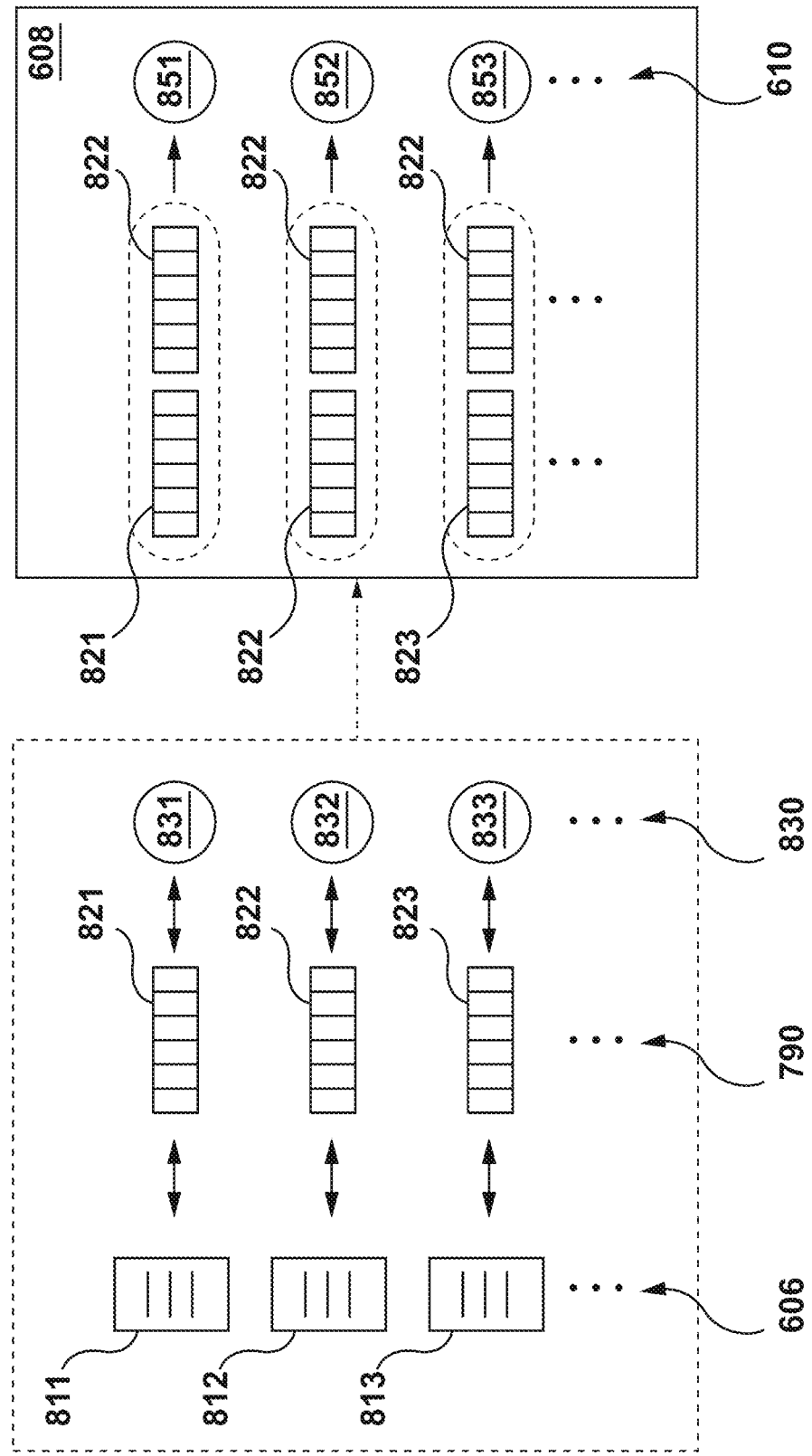
FIG. 8 depicts a schematic diagram of a Document Similarity Determination (DSD) procedure of the processing sequence of FIG. 6 in accordance with a first non-limiting embodiment of the present technology.

With reference to FIG. 8, a first embodiment of the DSD procedure 608 is illustrated. Let it be assumed that the plurality of documents 606 comprises:

a first document 811 having a first document vector 821 from the plurality of document vectors 790, and a first Q2D proximity value 831 (e.g., proximity to the query vector 760) from a plurality of Q2D proximity values 830;

a second document 812 having a second document vector 822 from the plurality of document vectors 790, and a second Q2D proximity value 832 from the plurality of Q2D proximity values 830; and a third document 813 having a third document vector 823 from the plurality of document vectors 790, and a third Q2D proximity value 833 from the plurality of Q2D proximity values 830.

In the first embodiment of the DSD procedure 608, the server 106 may determine that the another document vector to be used for determining the plurality of D2D proximity values 610 is a given document vector from the plurality of document vectors 790 that is associated with a highest Q2D proximity value amongst the plurality Q2D proximity values 830. For example, the server 106 may (i) determine which one of the plurality of document vectors 790 is associated with the highest Q2D proximity value amongst the plurality Q2D proximity values 830, and (ii) select that document vector as the another document vector of the DSD procedure 608.

Let it be assumed that the highest Q2D proximity value amongst the plurality Q2D proximity values 830 is the second Q2D proximity value 832. This means that the second document 812 associated with the second document vector 822 is likely to be the most relevant document amongst the plurality of documents 606.

The server 106 may thus be configured to determine for a given document from the plurality of documents 606, a respective D2D proximity value between (i) the document vector of the given document and (ii) the document vector of a document from the plurality of documents 606 that is likely to be the most relevant document from the plurality of documents 606. As illustrated, the server 106 may be configured to determine:

for the first document 811, a first D2D proximity value 851 between (i) the first document vector 821 and (ii) the second document vector 822;

for the second document 812, a second D2D proximity value 852 between (i) the second document vector 822 and (ii) the second document vector 822; and for the third document 813, a third D2D proximity value 853 between (i) the third document vector 823 and (ii) the second document vector 822.

As a result, in some embodiments, the server 106 may be configured to determine, for a given document from the plurality of documents 606, a respective D2D proximity value that is indicative of a similarity between (i) the given document and (ii) a document that is likely to be the most relevant document from the plurality of documents 606. Put another way, the server 106 may be configured to determine:

the first D2D proximity value 851 being indicative of a similarity between the first document 811 and the document that is likely to be the most relevant document amongst the plurality of documents 606;

the second D2D proximity value 852 being indicative of a similarity between the second document 812 and the document that is likely to be the most relevant document amongst the plurality of documents 606; and the third D2D proximity value 853 being indicative of a similarity between the third document 813 and the document that is likely to be the most relevant document amongst the plurality of documents 606.

Figure 9:
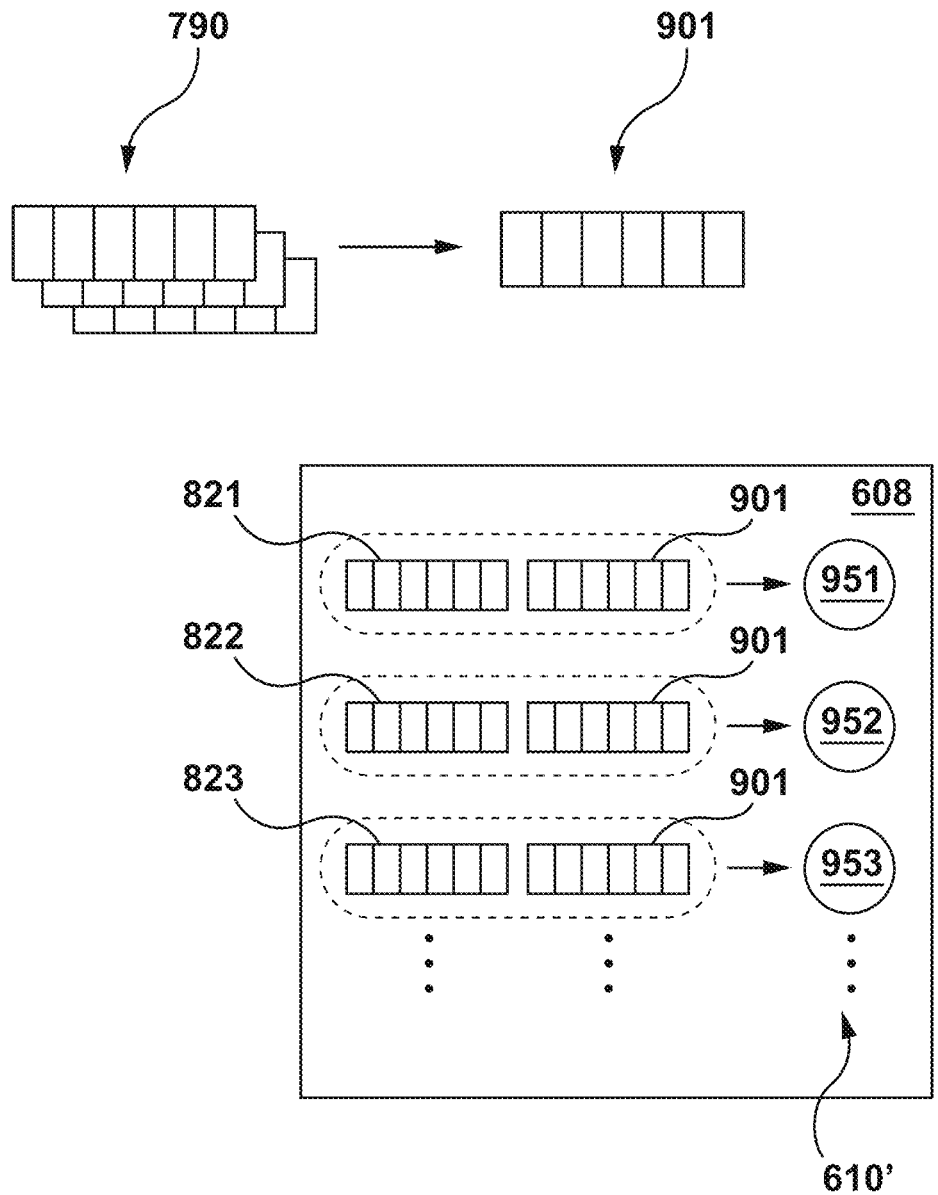
FIG. 9 depicts a schematic diagram of the DSD procedure in accordance with a second non-limiting embodiment of the present technology.

With reference to FIG. 9, a second embodiment of the DSD procedure 608 is illustrated. In the second embodiment of the DSD procedure 608, instead of using the document vector of the document that is likely to be the most relevant document amongst the plurality of documents 606 as the another document vector for determining the plurality of D2D proximity values 610, the server 106 may be configured to generate a reference vector 901 and use it as the another document vector for determining a plurality of D2D proximity values 610'.

It is contemplated that the server 106 may be configured to generate the reference vector 901 based on a combination of the plurality of document vectors 790. In other words, the server 106 may be configured to generate the reference vector 901 for the plurality of documents 606 by combining documents vectors from the plurality of document vectors 790.

For example, the server 106 may be configured to determine an average vector based on the plurality of document vectors 790 and use it as the reference vector 901. In another example, the server 106 may be configured to determine a mean vector based on plurality of document vectors 790 and use it as the reference vector 901. In a further example, the server 106 may be configured to determine a medoid vector based on the plurality of document vectors 790 and use it as the reference vector 901.

Once the reference vector is generated, the server 106 may be configured to determine for a given document from the plurality of documents 606, a respective D2D proximity value between (i) the document vector of the given document and (ii) the reference vector 901. As illustrated, the server 106 may be configured to determine:

for the first document 811, a first D2D proximity value 951 between (i) the first document vector 821 and (ii) the reference vector 901;

for the second document 812, a second D2D proximity value 952 between (i) the second document vector 822 and (ii) the reference vector 901; and for the third document 813, a third D2D proximity value 953 between (i) the third document vector 823 and (ii) the reference vector 901.

As a result, in some embodiments, the server 106 may be configured to determine, for a given document from the plurality of documents 606, a respective D2D proximity value that is indicative of a similarity between (i) the given document and (ii) the other ones from the plurality of documents 606. It can also be said that the server 106 may be configured to determine, for a given document from the plurality of documents 606, a respective D2D proximity value that is indicative of a similarity between (i) the given document and, (ii) in a sense, "an average document" from the plurality of documents 606.

It should be noted that the server 106 is not per se configured to generate this "average document". However, the server 106 may be configured to use the reference vector 901 that is representative of this "average document" for determining how similar it is to a given document.

For example, the higher the first D2D proximity value 951 between (i) the first document vector 821 of the first document 811 and (ii) the reference vector 901 of the "average document" is, the more the first document vector 821 is likely to be similar to the other ones from the plurality of documents 606. In another example, the lower the first D2D proximity value 951 between (i) the first document vector 821 of the first document 811 and (ii) the reference vector 901 of the "average document" is, the less the first document 811 is more likely to be similar to the other ones from the plurality of documents 606.

Broadly speaking, determining the plurality of D2D proximity values 610', as described above, may provide the server 106 with the capability of determining, in a sense, "outliers" within the plurality of documents 606. Although documents within the plurality of documents are likely to be relevant to the query 750, some documents from the plurality of documents may not be similar to most of the documents in the plurality of documents 606. Indeed, the server 106 may determine that some documents from the plurality of documents 606 are less likely to be similar to the "average document" from the plurality of documents 606, and may use this knowledge for ranking purposes. By the same token, the server 106 may also determine that other documents from the plurality of documents 606 are more likely to be similar to the "average document" from the plurality of documents 606, and may use this knowledge for ranking purposes.

It is contemplated that in at least some embodiments of the present technology, the server 106 may be configured to determine more than one D2D proximity values for a given one from the plurality of documents 606 and use the more than one D2D proximity values for a given one from the plurality of documents 606 as more than one "ranking features" for the given one from the plurality of documents 606. For example, the more than one D2D proximity values for the given one from the plurality of documents 606 may include D2D proximity values between (i) the respective document vector for the given one from the plurality of documents 606 and (ii) a document vector for a respective another one of the plurality of documents 606. In such a way, the more than one D2D proximity values for a given one from the plurality of documents 606 may be indicative of how likely the given one of the plurality of documents 606 is to be similar to each respective document from the plurality of documents 606.

How the server 106 is configured to perform the ranking procedure 612 will now be described in greater detail.

Ranking Procedure

With reference to FIG. 6, the server 106 may perform the ranking procedure 612 for generating the ranked list of documents 614. For example, the server 106 may be configured to execute one or more ranking algorithms (not depicted) as part of the ranking procedure 612. Broadly speaking, the server 106 may use the one or more ranking algorithms for ranking at least some of the plurality of document 606 into the ranking list of documents 614 based on inter alia (i) query data associated with the query 750, (ii) document data associated with respective ones from the plurality of documents 606, and (iii) additional document data representative of the plurality of D2D proximity values 610 (and/or the plurality of D2D proximity values 610').

The server 106 may be configured to retrieve the query data for the query 750 and the document data for the respective ones from the plurality of documents from the search engine data repository 160 (see FIG. 1). The server 106 may be configured to retrieve the additional document data (e.g., the plurality of D2D proximity values 610 and/or the plurality of D2D proximity values 610') from the operational repository 170.

In some embodiments, the one or more ranking algorithms may rank the at least some of the plurality of documents 606 into the ranked list of documents 614 further based on the plurality of Q2D proximity values 780 (see FIG. 7), without departing from the scope of the present technology. The server 106 may be configured to retrieve the plurality of Q2D proximity values 780 from the operational repository 170.

Once the server 106 ranks the at least some of the plurality of documents 606 into the ranked list of documents 614, the server 106 may be configured to trigger display of a SERP on the device 102 associated with the user 101 (see FIG. 1). This SERP may include a plurality of search results and where (i) at least some of the plurality of documents 606 are used as the plurality of search results (ii) the plurality of search results are ranked in a same order as the ranked list of documents 614. For example, the server 106 may generate the response 190 comprising information for triggering the display of such SERP.

Supplementation of Document Data

As alluded to above, at least some embodiments of the present technology may provide the server 106 with the capability of supplementing missing document data associated with the pool of documents 450.

To better illustrate this, let it be assumed that a first given document form the plurality of documents 606 has document data of the first type available at the search engine data repository 160, while document data of the first type for a second given document from the plurality of documents 606 is missing from the search engine data repository. In such a case, the server 106 may supplement the document data of the first type for the second given document in different ways.

In a first case, the server 106 may be configured to determine a respective Q2D proximity value for each one of the first given document and the second given document. If the difference between the two Q2D proximity values is below a threshold, the first given document and the second given document have a similar relevance to a given query. As such, the document data of the first type of the first given document may be used by the server 106 as an estimation of the document data of the first type of the second given document since the document data of both the first given document and of the second given document are likely to be similar.

In a second case, the server 106 may be configured to determine a D2D proximity value between the first given document and the second given document. If this D2D proximity value is above a threshold, the first given document and the second given document are likely to be very similar. As such, the document data of the first type of the first given document may be used by the server 106 as an estimation of the document data of the first type of the second given document since the document data for both the first given document and the second given document are likely to be similar.

Figure 10:
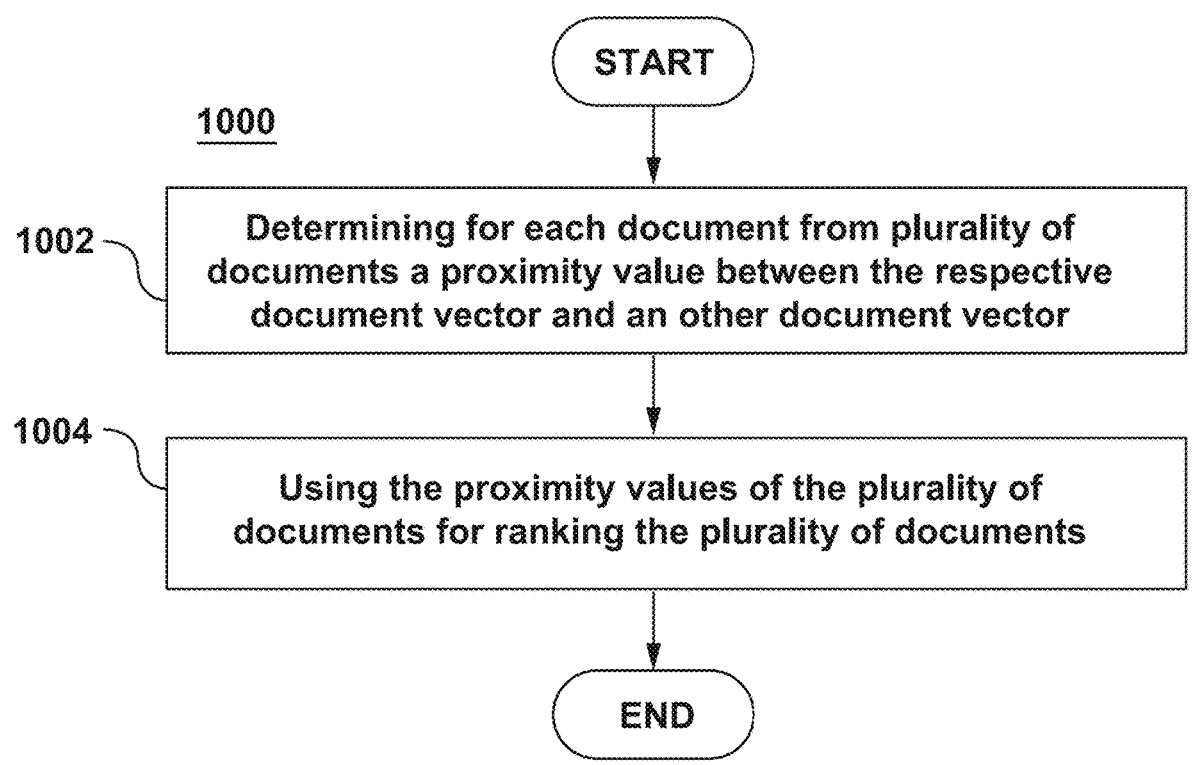
FIG. 10 is a block diagram depicting a flow chart of a method of ranking documents executable by the server of FIG. 1 in accordance with non-limiting embodiments of the present technology.

In some embodiments of the present technology, the server 106 is configured to execute a method 1000, depicted in FIG. 10, of ranking the plurality of documents 606 in the database system 150. The method 800 will now be described.

Step 1002: Determining for Each Document from the Plurality of Documents a Proximity Value Between the Respective Document Vector and an Other Document Vector The method 1000 may begin at step 1002 with the server 106 being configured to determine for each document from the plurality of documents 606 a proximity value between the respective document vector and an other document vector.

For example, as described above, the server 106 may be configured to determine, during the step 1002, the plurality of D2D proximity values 610 and/or the plurality of D2D proximity values 610'.

In embodiments where the server 106 is configured to determine the plurality of D2D proximity values 610', as described above with reference to FIG. 9, the server 106 may also be configured to generate the reference vector 910 for the plurality of documents 606 as a combination of the plurality of document vectors 790 associated with the plurality of documents 606.

It is contemplated that the reference vector 910 may be one of (i) an average vector generated based on the plurality of document vectors 790, (ii) a mean vector generated based on the plurality of document vectors 790, and (iii) a medoid vector generated based on the plurality of document vectors 790.

It is also contemplated that the plurality of documents 606 may be pre-selected from the pool of documents 450 for ranking purposes, as explained above. As such, the pre-selection may be executed by the server 106 prior to performing the step 1002, without departing from the scope of the present technology. For example, this pre-selection may be executed by the server 106 performing the pre-selection procedure 604 as described above with reference to FIG. 7.

Step 1004: Using the Proximity Values of the Plurality of Documents for Ranking the Plurality of Documents The method 1000 continues to step 1004 with the server 106 being configured to use the plurality of D2D proximity values 610 and/or the plurality of D2D proximity values 610' for ranking the plurality of documents 606 in response to the query 750 (see FIG. 7).

In some embodiments, to that end, the server 106 may be configured to execute one ore more ranking algorithms configured to rank the plurality of documents 606 based on (i) the document data associated with the respective documents from the plurality of documents 606 (as available in the search engine data repository 160, for example) and (ii) additional document data associated with the plurality of documents 606. In this case, the plurality of D2D proximity values 610 and/or the plurality of D2D proximity values 610' may be used as the additional document data associated with the plurality of documents 606.

In at least some embodiments of the present technology, the server 106 may also be configured to use a D2D proximity value for a pair of documents in order to supplement missing document data about one of the pair of documents, as described above.

It should be apparent to those skilled in the art that at least some embodiments of the present technology aim to expand a range of technical solutions for addressing a particular technical problem encountered by the conventional digital content item recommendation systems, namely selecting and providing for display digital content items that are relevant to the users.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method of ranking a plurality of documents, the plurality of documents being associated with respective document data, the plurality of documents to be used as search results in response to a query submitted by a user, the query being associated with query data, the query having been submitted to a search engine hosted by a server, the method comprising:
generating, by the server executing a Machine Learning Algorithm (MLA), a plurality of document vectors for the plurality of documents and a query vector for the query,
a given document vector being generated based on the document data associated with a respective document from the plurality of documents and the query vector being generated based on the query data associated with the query,
the MLA having been trained:
based on a given training document-query pair associated with a respective relevance score,
the relevance score being indicative of a relevance of a training document in the given training pair to a training query in the given training pair,
to generate (i) a training document vector for the training document and (ii) a training query vector for the training query, such that a query-to-document (Q2D) proximity value between (i) the training document vector of the training document and (ii) the training query vector of the training query is representative of the relevance score,
executing a two-step ranking process including (i) a first ranking step based on Q2D proximity values between the query vector and respective ones amongst the plurality of document vectors, and (ii) a second step based on document-to-document (D2D) proximity values between document vectors,
the first step including:
determining, by the server, for each document from the plurality of documents, a corresponding Q2D proximity value between the query vector and the respective document vector, a given Q2D proximity value for a respective document being indicative of a similarity between (i) the query and (ii) the respective document,
determining, by the server, a reduced plurality of documents using the Q2D proximity values of the plurality of documents;
the second step including:
determining, by the server, for each document from the reduced plurality of documents a D2D proximity value between the respective document vector and an other document vector,
a given D2D proximity value for a respective document being indicative of a similarity between (i) the respective document and (ii) at least one other one from the reduced plurality of documents; and
ranking, by the server, documents from the reduced plurality of documents using the D2D proximity values of the reduced plurality of documents;
triggering, by the server, display of at least some of documents from the ranked reduced plurality of documents to the user.

2. The method of claim 1, wherein the method further comprises:
generating, by the server, a reference vector for the plurality of documents as a combination of document vectors associated with the plurality of documents,
the reference vector is the other document vector,
the given D2D proximity value being indicative of the similarity between (i) the respective document and (ii) other ones from the plurality of documents.

3. The method of claim 2, wherein the reference vector is one of:
an average vector generated based on the plurality of document vectors;
a mean vector generated based on the plurality of document vectors; and
a medoid vector generated based on the plurality of document vectors.

4. The method of claim 1, wherein the plurality of documents is pre-selected from a pool of documents for ranking,
the pre-selection being executed by the server prior to the executing the two-step ranking process.

5. The method of claim 4, wherein the pre-selection includes
determining, by the server, respective frequency parameters for documents from the pool of documents,
a given frequency parameter being indicative of a number of times query terms from the query are present in the respective document; and
selecting, by the server, a first set of documents from the pool of documents,
the first set of documents having documents associated with respective frequency parameters that are above a first threshold.

6. The method of claim 1, wherein the server executes a ranking algorithm configured to rank the plurality of documents based on (i) the document data associated with the respective documents from the plurality of documents and (ii) additional document data associated with the plurality of documents.

7. The method of claim 6, wherein the using the D2D proximity values of the plurality of documents for ranking the plurality of documents comprises:
using, by the server, the D2D proximity values as the additional document data for ranking the plurality of documents by the ranking algorithm.

8. The method of claim 1, wherein document data comprises document data of a first type.

9. The method of claim 8, wherein a first document from the plurality of documents has document data of the first type and a second document from the plurality of documents is missing document data of the first type, and wherein the method further comprises:
determining, by the server, a D2D proximity value between (i) the document vector of the first document and (ii) the document vector of the second document; and
in response to the D2D proximity value between (i) the document vector of the first document and (ii) the document vector of the second document being above a threshold, using, by the server, the document data of the first type of the first document as an estimation of the document data of the first type of the second document.

10. The method of claim 1, wherein triggering display of at least some of documents from the ranked reduced plurality of documents comprises:
triggering, by the server, display of a Search Engine Results Page (SERP) on a device associated with the user,
the SERP including a plurality of search results, the plurality of documents being used as the plurality of search results, the plurality of search results being ranked in a same order as the ranked reduced plurality of documents.

11. The method of claim 1, wherein the MLA is a Neural Network (NN), the NN comprises a document-dedicated portion and a query-dedicated portion,
(i) the document-dedicated portion being configured to generate the training document vector based on document data associated with the training document,
(ii) the query-dedicated portion being configured to generate the training query vector based on query data associated with the training query, and
the document-dedicated portion and the query-dedicated portion having been trained together such that the Q2D proximity value between (i) the training document vector and (ii) the training query vector is representative of the relevance score.

12. A server for ranking a plurality of documents, the plurality of documents being associated with respective document data, the plurality of documents to be used as search results in response to a query submitted by a user, the query being associated with query data, the query having been submitted to a search engine hosted by the server, the server comprising a hardware processor, the server being configured to:
generate a plurality of documents vectors for the plurality of documents and a query vector for the query by executing a Machine Learning Algorithm (MLA),
a given document vector being generated based on the document data associated with a respective document and the query vector being generated based on the query data associated with the query,
the MLA having been trained:
based on a given training document-query pair associated with a respective relevance score,
the relevance score being indicative of a relevance of a training document in the given training pair to a training query in the given training pair,
to generate (i) a training document vector for the training document and (ii) a training query vector for the training query, such that a query-to-document (Q2D) proximity value between (i) the training document vector of the training document and (ii) the training query vector of the training query is representative of the relevance score,
execute a two-step ranking process including (i) a first ranking step based on Q2D proximity values between the query vector and respective ones amongst the plurality of document vectors, and (ii) a second step based on document-to-document (D2D) proximity values between document vectors,
the server being configured to, during the first step:
determine, for each document from the plurality of documents, a corresponding Q2D proximity value between the query vector and the respective document vector, a given Q2D proximity value for a respective document being indicative of a similarity between (i) the query and (ii) the respective document,
determine a reduced plurality of documents using the Q2D proximity values of the plurality of documents;
the server being configured to, during the second step:
determine, for each document from the reduced plurality of documents, a D2D proximity value between the respective document vector and an other document vector,
a given D2D proximity value for a respective document being indicative of a similarity between (i) the respective document and (ii) at least one other one from the reduced plurality of documents; and
rank documents from the reduced plurality of documents using the D2D proximity values of the reduced plurality of documents; use the proximity values of the plurality of documents for ranking the plurality of documents;
trigger display of at least some of documents from the ranked reduced plurality of documents to the user.

13. The server of claim 12, wherein the server is further configured to:
generate a reference vector for the plurality of documents as a combination of document vectors associated with the plurality of documents,
the reference vector is the other document vector,
the given D2D proximity value being indicative of the similarity between (i) the respective document and (ii) other ones from the plurality of documents.

14. The server of claim 13, wherein the reference vector is one of:
an average vector generated based on the plurality of document vectors;
a mean vector generated based on the plurality of document vectors; and
a medoid vector generated based on the plurality of document vectors.

15. The server of claim 12, wherein the plurality of documents is pre-selected from a pool of documents for ranking, the pre-selection being executed by the server prior to the executing the two-step ranking process.

16. The server of claim 15, wherein the pre-selection includes the server configured to:
determine respective frequency parameters for documents from the pool of documents,
a given frequency parameter being indicative of a number of times query terms from the query are present in the respective document; and
select a first set of documents from the pool of documents, the first set of documents having documents associated with respective frequency parameters that are above a first threshold.

\* \* \* \* \*